United States Patent
Jiang et al.

(10) Patent No.: US 9,106,961 B2
(45) Date of Patent: Aug. 11, 2015

(54) METHOD, SYSTEM, AND APPARATUS FOR MARKING POINT OF INTEREST VIDEO CLIPS AND GENERATING COMPOSITE POINT OF INTEREST VIDEO IN A NETWORK ENVIRONMENT

(75) Inventors: Jason Y. Jiang, Fremont, CA (US); Munawar Hossain, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 13/470,102

(22) Filed: May 11, 2012

(65) Prior Publication Data

US 2013/0302018 A1    Nov. 14, 2013

(51) Int. Cl.
   *H04N 9/80*     (2006.01)
   *H04N 21/472*   (2011.01)
   *H04N 5/783*    (2006.01)
   *H04N 9/82*     (2006.01)

(52) U.S. Cl.
   CPC ......... *H04N 21/47217* (2013.01); *H04N 5/783* (2013.01); *H04N 9/8205* (2013.01)

(58) Field of Classification Search
   CPC ..... H04N 7/17318; H04N 7/147; H04N 7/15; H04N 7/155; H04N 5/76; G11B 20/0021; G11B 20/00862; G11B 20/00115; G11B 20/00362; G11B 20/00528; G11B 20/00847; G06T 5/10; G06T 5/001
   See application file for complete search history.

(56) References Cited

U.S. PATENT DOCUMENTS

| | | | | |
|---|---|---|---|---|
| 5,930,446 A | * | 7/1999 | Kanda | 386/282 |
| 2007/0154176 A1 | * | 7/2007 | Elcock et al. | 386/95 |
| 2012/0148215 A1 | * | 6/2012 | Kennedy | 386/278 |
| 2012/0254716 A1 | * | 10/2012 | Choi et al. | 715/230 |

OTHER PUBLICATIONS

"Microcone Remote: Remote Control for Microcone Recorder," Mar. 6, 2012, 4 pages; http://www.dev-audio.com/products/products/remote.html.
"Microcone Recorder: Innovative Meeting Recording System," Apr. 17, 2012, 2 pages; http://www.dev-audio.com/products/recorder/.
Cisco, "Cisco MXE 3500 Media Experience Engine," Product Overview Data Sheet, Apr. 17, 2012, 8 pages; http://www.cisco.com/en/US/prod/collateral/video/ps9901/ps10631/data_sheet_c78-565206_ps12130_Products_Data_Sheet.html.

* cited by examiner

*Primary Examiner* — Tat Chio
(74) *Attorney, Agent, or Firm* — Patent Capital Group

(57) ABSTRACT

A method is provided in one example and includes receiving an indication of a start of a point of interest associated with a portion of a video presentation, and determining a start time relative to a start time of the video presentation. The method further includes receiving an indication of an end time of the point of interest, and determining an end time of the point of interest relative to the start time of the video presentation. The method still further includes generating point of interest data that includes the start time and end time of the point of interest, and sending the point of interest data to a processing device. The processing device generates a composite point of interest video including the portion of the video presentation associated with the point of interest.

22 Claims, 10 Drawing Sheets

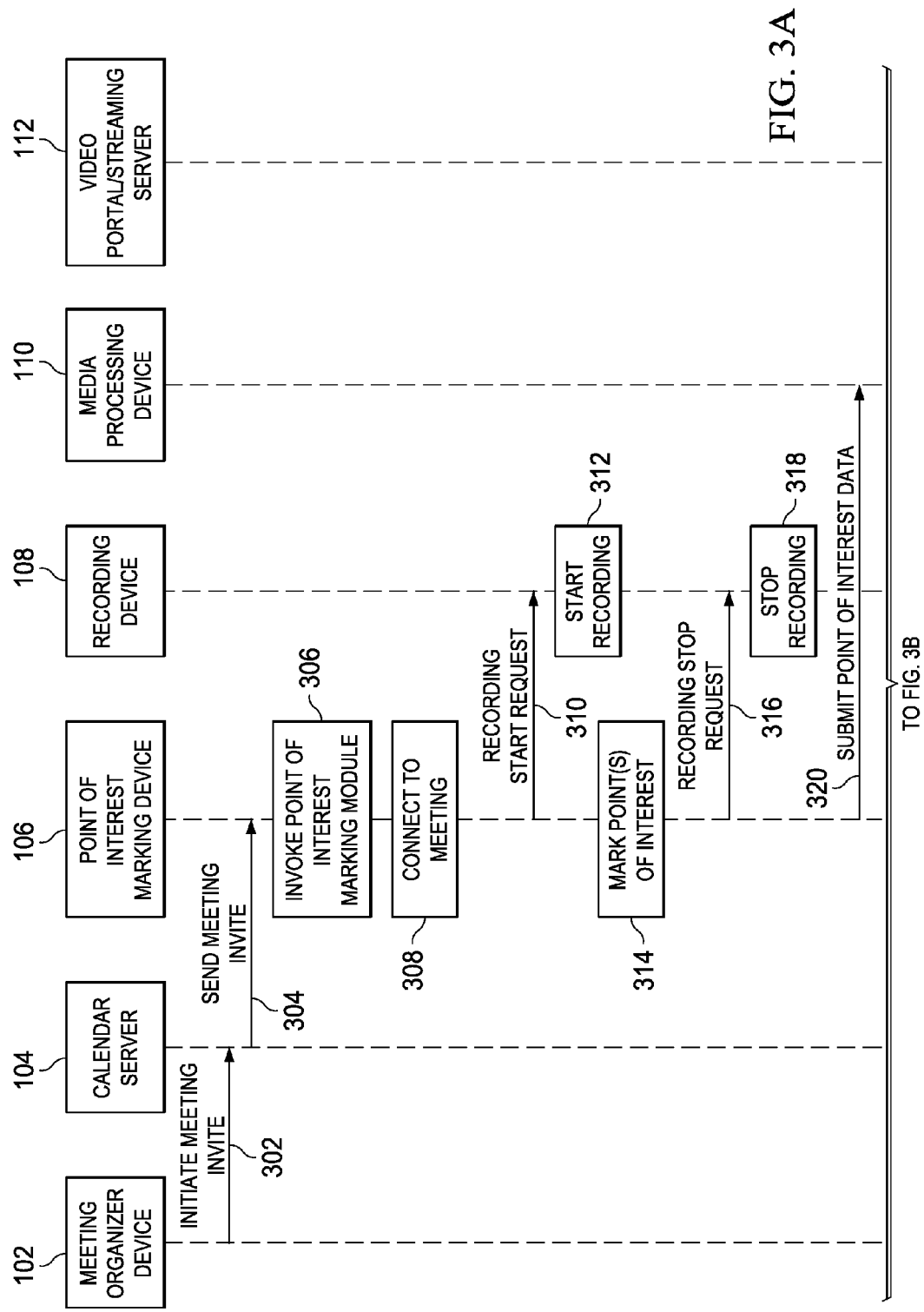

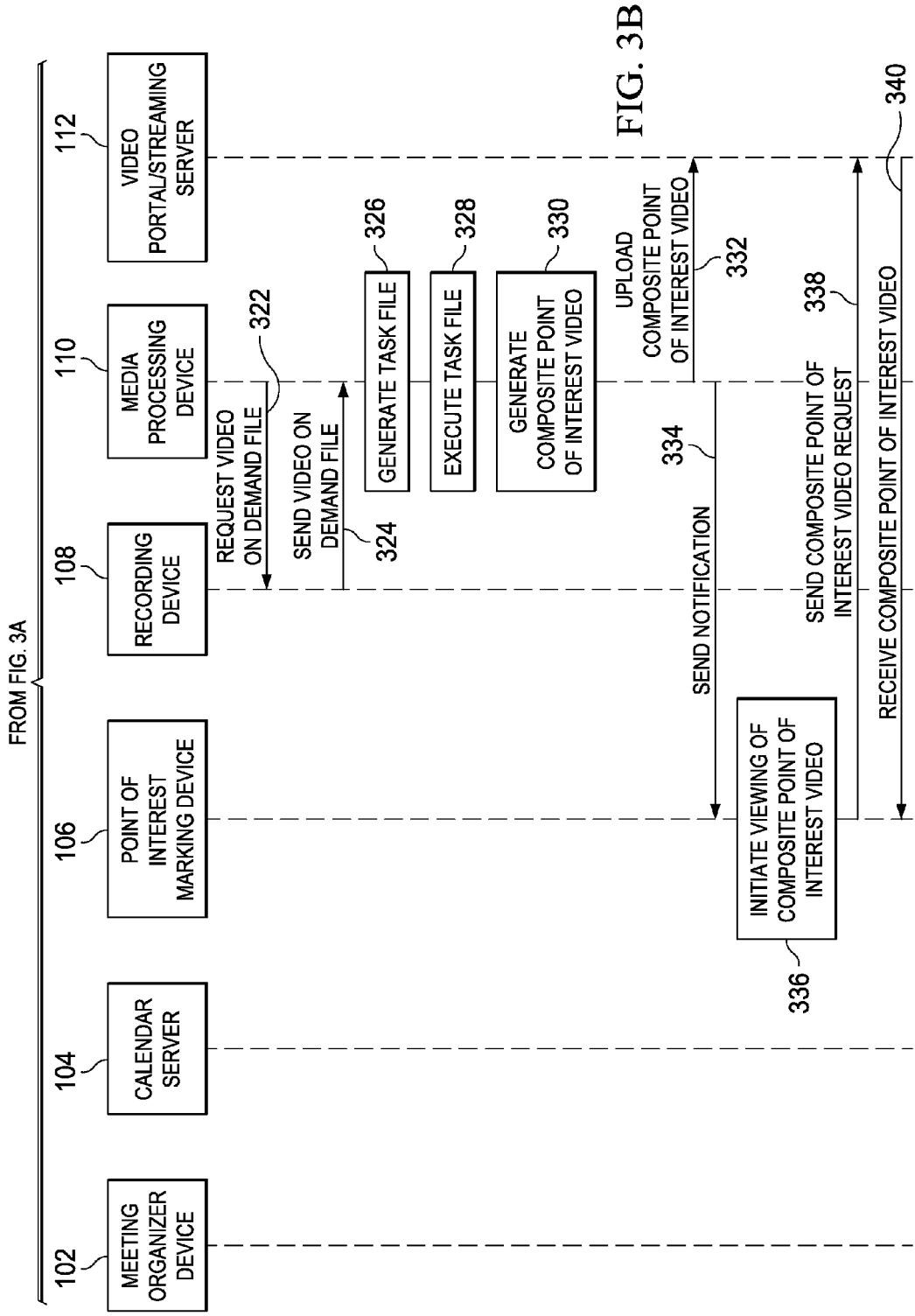

METHOD, SYSTEM, AND APPARATUS FOR MARKING POINT OF INTEREST VIDEO CLIPS AND GENERATING COMPOSITE POINT OF INTEREST VIDEO IN A NETWORK ENVIRONMENT

TECHNICAL FIELD

This disclosure relates in general to the field of communications and, more particularly, to marking point of interest video clips and generating composite point of interest video in a network environment.

BACKGROUND

A point-of-interest (POI) video clip is a video clip, which includes a subset of the video of an original video recording. The POI video clip is marked by a start time and an end time relative to the beginning of the original video recording of an event. A composite POI video consists of one or more POI video clips. An event may include, for example, a meeting, a training session being recorded, a video on demand (VoD) presentation being watched by an end user, or any other video presentation. Traditionally, extracting point of interest (POI) video clips is handled after an event is completed, and the editing of the recorded video file is performed by a person using specially designed video editing software. Traditionally, in order to successfully create a composite POI video, a number of conditions should be met that are often difficult to realize, especially in a corporate environment. In addition, creating a composite POI has traditionally been a time-consuming process.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 3A-3B are a simplified flow diagram of a procedure for marking point of interest (POI) video clips in real-time and generating composite point of interest (POI) video in accordance with one embodiment of the present disclosure;

DETAILED DESCRIPTION OF EXAMPLE EMBODIMENTS

Overview

Figure 1:
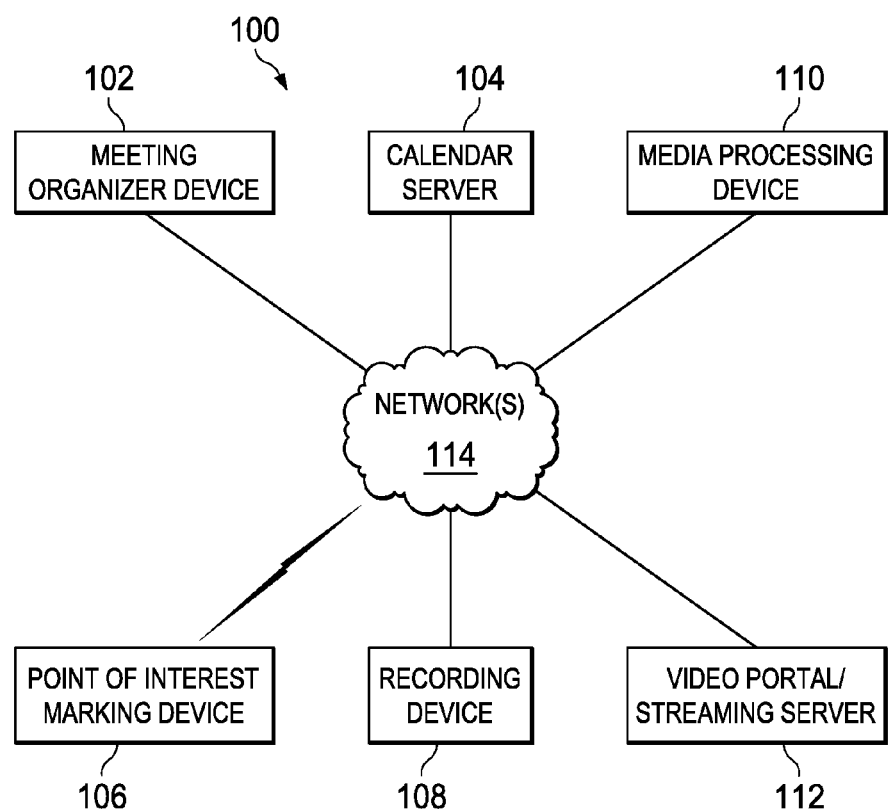
FIG. 1 is a simplified block diagram of a communication system for marking point of interest (POI) video clips in real-time and generating composite point of interest (POI) video in accordance with one embodiment of the present disclosure.

A method is provided in one example embodiment and includes receiving an indication of a start of a point of interest associated with a portion of a video presentation. The 'indication' in this context can include any signal, message, alert, notification, etc. that would be able to serve such a purpose. The method also includes determining a start time of the point of interest relative to a start time of the video presentation. The method further includes receiving an indication of an end time of the point of interest, and determining an end time of the point of interest relative to the start time of the video presentation. The method still further includes generating point of interest data that includes the start time and end time of the point of interest, and sending the point of interest data to a processing device. In this context, the 'processing device' can include any type of computer, server, module, or other hardware/software that can receive and/or process this incoming data. The processing device generates a composite point of interest video including the portion of the video presentation associated with the point of interest.

In more particular embodiments, the receiving of the indication of the start of the point of interest is performed in real-time in conjunction with presenting the video presentation. In other particular embodiments, the receiving of the indication of the end time of the point of interest is performed in real-time in conjunction with presenting the video presentation. In still more particular embodiments, the method further includes sending a recording start request to a recording device, wherein the recording device initiates recording of the video presentation responsive to receiving the start request. In still other particular embodiments, the method further includes receiving a notification including a link associated with the composite point of interest video. In some particular embodiments, the method further includes receiving the composite point of interest video associated with the composite point of interest video. In still other more particular embodiments, the method further includes receiving textual data associated with the point of interest, wherein the point of interest data further includes the textual data.

A method is provided in another example embodiment and includes receiving point of interest data, wherein the point of interest data includes a start time and end time of a point of interest associated with a portion of a video presentation. One or more of the start time and end time of the point of interest are determined in real-time with a presenting of the video presentation. The method further includes receiving a video file associated with the video presentation, and generating a composite point of interest video file from the video file based on the start time and end time of the point of interest. In still other embodiments, the method further includes sending the composite point of interest video file to a server. In still other particular embodiments, the method further includes sending a notification including a link associated with a location of the composite point of interest video file on the server. In still other embodiments, the method further includes comprising parsing the point of interest data to obtain the start time and end time of the point of interest.

Example Embodiments

Referring now to FIG. 1, FIG. 1 is a simplified block diagram of a communication system 100 for marking points of interest video clips in real-time and generating composite point of interest video in accordance with one embodiment of the present disclosure. The communication system 100 includes a meeting organizer device 102, a calendar server 104, a point of interest (POI) marking device 106, a recording device 108, a media processing device 110, and a video portal/streaming server 112. Each of meeting organizer device 102, calendar server 104, POI marking device 106, recording device 108, media processing device 110, and video portal/streaming server 112 are in communication with network(s) 114.

In accordance with the teachings of the present disclosure, communication system 100 is configured for marking POI video clips in real-time and, further, generating composite POI video that includes the marked POI video clips. In a general sense, a POI video clip represents a subset of an original video recording, which can be marked by a start time and an end time (e.g., relative to the beginning of the original video recording of an event). A composite POI video can comprise one or more POI video clips, and may include metadata having textual data such as notes and comments associated with the POI video clips as well. An event may be a meeting, a training session, video on demand (VoD) or any video presentation, either live or already recorded, being viewed by an end user.

Traditionally, extracting point of interest (POI) video clips is handled after an event is completed, and the editing of the recorded video file is performed by a person using specially-designed video editing software. Typically, to successfully create a composite POI video, the following conditions should be met: a video on demand (VoD) file is successfully created during an event; the VoD file is accessible to the user who wants to create a composite POI video; the user who wants to create composite POI video has access to video editing software and knows how to perform such operations; the user has the time to perform such operations; the user needs to watch the VoD on a personal computer (PC) and mark the start and end points of POIs using the video editing software; the video editing software will then compose a new video using the marked POI clips; and the end user will be responsible for publishing and announcing the availability of the new composite POI video for others to view.

In reality, one or more of the above conditions is not easily met, resulting in difficulty in creating and sharing POI videos. Such a process is especially difficult in a corporate environment. In a corporate environment, the recording of VoD files is typically controlled by a meeting host, and is only available to the host. Although people have the need to mark one or more POI video clips during a meeting, previously the lack of an easy to use tool makes this task difficult to accomplish. Video editing software is not always available to the user who wants to create composite POI video, and when both the original VoD and the video editing software is made available, users often don't have enough time or knowledge to go through the time-consuming video extraction process in order to create a composite POI video.

Various embodiments described herein provided a method, system, and apparatus for marking point of interest video clips in real-time and generating composite point of interest video. In particular embodiments, an application runs on a handheld device, such as an iPhone or Android phone, which a user carries to an event presentation. The user can use the application running on the handheld device to mark the start and end for each POI clip in real-time while the event is taking place or is being broadcast. The user then submits a POI data file including the POI start and end times and other POI data associated with the event to a predefined network service termed a media processing device (MPD). After receiving this POI data file, the MPD processes the POI data file and generates a task file therefrom. This task file instructs the MPD to extract POI video clips from the VoD file or other recorded video file associated with this event to generate composite POI video. In some embodiments, the MPD may further perform post-processing special effects such as adding fade-in/fade-out effects, adding bumper/trailer video, and adding graphics overlays, etc. to the composite POI video. In some embodiments, the media processing device (MPD) will automatically publish the composite POI video to a video portal and/or to a streaming server. The MPD then sends a notification to the user with one or more links, such as a Uniform Resource Locator (URL), to a location of the composite POI video on the video portal or streaming server. The user may then watch the composite POI video on the handheld device or another suitable device.

Compared to the traditional processes, some embodiments described herein may have one or more of the following advantages: In at least one embodiment, POI videos can be easily marked in real-time when an event is happening. In some embodiments, an application running on the user's handheld device is all that the user needs to interact with in order to create a composite POI video from a video presentation. In addition, in some embodiments there is no need for a user to run special video editing software on a client desktop. In addition, some embodiments provide the advantage of having a network-based service to perform the task of composing the composite POI video to eliminate the need for an end user to use specialized video editing software. In addition, one or more embodiments may allow all event participants to mark their POIs individually in real-time with a broadcasting of the video presentation. Still other embodiments may allow automatic publishing of the composite POI video. Still other embodiments may enable "wisdom of the crowd" functionality by comparing and sharing of POIs from multiple participants to generate a composite POI video reflecting marked POIs from multiple users. In some embodiments, presentation videos are made easier to consume as only the most relevant moments during an event are highlighted. In addition, in various embodiments the composite POI videos are usually much smaller in size than the original presentation video, thus making them easy to store, transfer, and share. Still other embodiments may allow easy extraction of video clips by average users without requiring the user to master complicated video authoring software or take the time to edit video after an event has ended.

In other embodiments, only certain sections of the video marked by a POI may be made available to a particular audience while restricting access by that particular audience to other portions of the video. One embodiment may allow use during a confidential meeting in which an entire VoD file is restricted to certain participants, but some POI clips can be of great value to other participants. For example, for video associated with a confidential meeting, a user may want to allow viewing of only a certain section of the video marked by a POI while restricting the rest of the video. In at least one embodiment, a value-added extension is provided by associating other time-based metadata, such as notes taken during the event, with the composite video so that much richer video content may be provided. For example, a user can designate POIs during a meeting while taking notes at the same time. At the end of the meeting, a composite video with notes can be produced. A user can then search the notes, and find the associated video clips such as by using advanced video analytics techniques.

Meeting organizer device 102 is a device configured to allow a meeting organizer to initiate a meeting invite to one or more participants of an event. In at least one embodiment, meeting organizer device 102 may comprise a personal computer. In one embodiment, a person may use meeting organizer device 102 to schedule a meeting. In still another embodiment, meeting organizer device 102 may be a network-based service configured to schedule meetings. In at least one embodiment, calendar server 104 is a system or device configured to provide calendar scheduling capability, such as provided by Microsoft Outlook, to one or more users. In at least one embodiment, the calendar scheduling capability may include receiving a meeting invite associated with an event from a meeting organizer and sending the meeting invite to one or more meeting participants. In one or more embodiments, the calendar server 104 marks a meeting on a user's calendar.

POI marking device 106 is a device configured to allow a meeting participant to mark start and ends times of one or more points of interest (POI) in a video of an event in real-time with the presentation or broadcasting of an event as the event occurs as will be further described herein. In various embodiments, POI marking device 106 may be further configured to receive a meeting invite associated with an event, initiate video recording of the event by recording device 108, stop video recording of event by recording device 108, and submit point of interest (POI) data to the media processing device 110 for further processing. In some embodiments, POI marking device 106 may be further configured to receive a link to a composite POI video generated from the point of interest (POI) data by media processing device 110 and view the composite POI video from video portal/streaming server 112. In at least one embodiment, POI marking device 106 is a handheld device such as a smart phone, a cell phone, a personal digital assistant (PDA), a laptop computer, a tablet, or any other multimedia-capable device. In particular embodiments, POI marking device 106 is in wireless communication with network(s) 114. In various embodiments, POI marking device 106 does not receive the video associated with the event. In such an embodiment, the user of POI marking device 106 accesses the video through other means such as through another device such as by using a computer. In still other embodiments, the user of POI marking device 106 is present at a location, such as a meeting room, in which the event is available for viewing by the user. The user then uses POI marking device 106 to perform one or more of initiating and/or stopping recording of the event, marking one or more POIs, transmitting a POI data file, and receiving a link to a composite POI video as will be further discussed herein. In still other embodiments, POI marking device 106 may be configured to receive the video of the event as well as provide the various functions described herein.

Recording device 108 is a device configured to record the video and any associated audio of the event and store the recorded video on one or more storage devices associated with recording device 108. In at least one embodiment, recording device 108 is a network-based service configured to record the video and audio of a presentation provided by another device or system. In another embodiment, recording device 108 may be integrated with the device providing the presentation.

Media processing device 110 is a device configured to receive point of interest (POI) data from POI marking device 106, retrieve the recorded video of the presentation from recording device 108, and process the recorded video in accordance with the POI data to generate a composite POI video file. Media processing device 110 may be further configured to upload the composite video to video portal/streaming server 112, and send a notification to the user of POI marking device 106 that includes a link from which the POI composite video can be obtained or viewed by the user.

Video portal/streaming server 112 is a system or device configured to receive and/or store the composite POI video file generated by media processing device 110 and stream or otherwise provide the composite POI video to one or more viewers such as a user of POI marking device 106. Various functions of meeting organizer device 102, calendar server 104, POI marking device 106, recording device 108, media processing device 110, and video portal/streaming server 112 will be described herein below.

Network(s) 114 may include one or more communication networks to facilitate communication between the various components of communication system 100. In at least one embodiment, network(s) 114 may include one or more of a packet-based network, such as the Internet, a wireless network, and a cellular-based network. In one particular instance, communication system 100 can be associated with a service provider digital subscriber line (DSL) deployment. In other examples, communication system 100 would be equally applicable to other communication environments, such as an enterprise wide area network (WAN) deployment, cable scenarios, broadband generally, fixed wireless instances, fiber to the x (FTTx), which is a generic term for any broadband network architecture that uses optical fiber in last-mile architectures. Communication system 100 may include a configuration capable of transmission control protocol/internet protocol (TCP/IP) communications for the transmission and/or reception of packets in a network. Communication system 100 may also operate in conjunction with a user datagram protocol/IP (UDP/IP) or any other suitable protocol, where appropriate and based on particular needs.

Figure 2A:
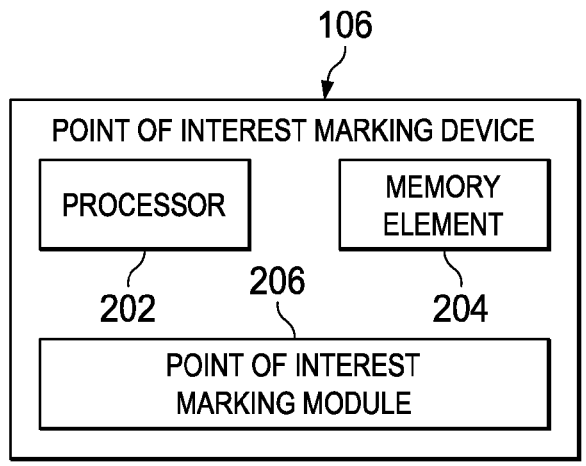
FIG. 2A is a simplified block diagram of a point of interest (POI) marking device in accordance with an embodiment of the present disclosure.

Referring now to FIG. 2A, FIG. 2A is a simplified block diagram of point of interest (POI) marking device 106 in accordance with an embodiment of the present disclosure. POI marketing device 106 includes a processor 202, a memory element 204, and a point of interest (POI) marking module 206. POI marking module 206 is configured to perform one or more of the functions of POI marking device 106 such as receiving a meeting invitation, joining a meeting, starting recording of the event, marking start and end times of points of interest (POIs) during an event, stopping recording of an event, and submitting POI data containing the POIs marked by the user to media processing device 110. In some embodiments, POI marking module 206 may be configured to receive a notification message containing a link to generated composite POI video, and view the composite POI video using the link as will be further described herein. In a particular embodiment, POI marking module 106 is a software application that may be downloaded or otherwise provided to the POI marking device 106 such as from a centralized smart phone application store or from a website. In a particular embodiment, the software application is designated with the name "Vtap." POI marking module 206 may further provide a graphical user interface (GUI) such as will be further described with respect to FIGS. 5A-5H.

In at least one embodiment, POI marking module 206 is configured to send a request in the form of a POI data file, which contains the following information: a User ID of the requester which identifies the user who submits the request; a Meeting ID which is used as a unique identifier for the meeting; a Sequence Number which Identifies a particular POI video clip sequence within a presentation; and a List of POI Start/End Time pairs. Each POI Start/End Time pair includes: a Start Time that designates the start time of the POI video clip portion; and an End Time that designates the end time of a POI video clip. In some embodiments, metadata associated with each point-of-interest (POI), such as notes entered by the user during the presentation, is included in the section of the POI data file associated with the particular POI.

In a particular embodiment, the User ID is associated with the user at the time of installation of the application on POI marking device 106. In still other embodiments, the User ID may be entered by the user. In a particular embodiment, the start and end times of a POI video clip are designated with reference to a time, such as in hours, minutes and seconds, since the beginning of the meeting or event. In various embodiments, the start and end times of a POI video clip are independent of any frame rate which may be associated with the video of the event. In some embodiments, a time clock of POI marking device 106 may be synchronized with a time clock associated with the event so that the marking of POIs by the user is synchronized with the presentation itself.

Figure 2B:
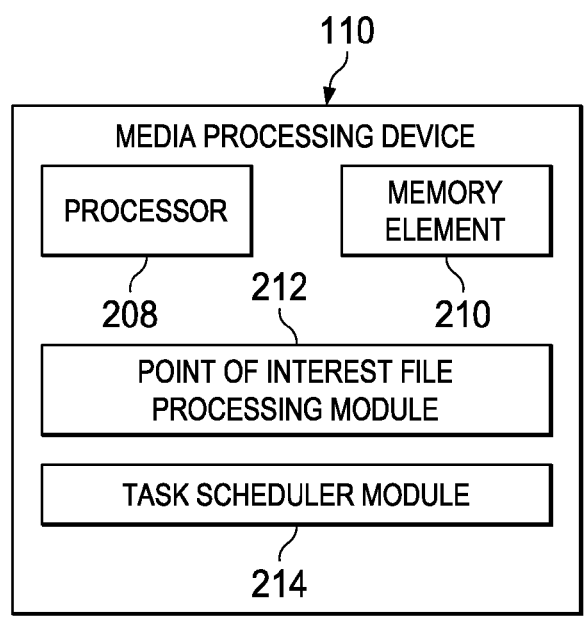
FIG. 2B is a simplified block diagram of a media processing device (MPD) in accordance with an embodiment of the present disclosure.

Referring now to FIG. 2B, FIG. 2B is a simplified block diagram of a media processing device (MPD) 110 in accordance with an embodiment of the present disclosure. MPD 110 includes a processor 208, a memory element 210, a point of interest (POI) file processing module 212, and a task scheduler module 214. POI file processing module 212 is configured to receive a request from POI marking device 106 including a POI data file and a meeting ID associated with an event, and fetch one or more recorded video files associated with the event. POI file processing module 212 is further configured to parse the POI data file and generate a task file from the POI data. The task file includes a designation of the source of video and/or audio associated with event as well as the start and end times of each POI designated by a user of POI marking device 106 during the event. In a particular embodiment the task file may be of the following format:

<header>
Contains metadata such as date, time, meeting title, participant names, author, etc.

```
    </header>
    <Content>
      <section of clip>
        <video source>source of video </video source>
        <audio source> source of audio</audio source>
        <start time>start time</start time>
        <end time>end time</end time>
      </section of clip>
      ...
      <section of clip>
        <video source>source of video </video source>
        <audio source> source of audio</audio source>
        <start time>start time</start time>
        <end time>end time</end time>
      </section of clip>
    </Content>
```

In other embodiments, the metadata associated with each point-of-interest (POI), such as notes entered by the user, is included in the section of the task file associated with the particular POI between the <section of clip> and </section of clip> designators within the task file.

In at least one embodiment, task scheduler 214 takes a task file and executes it on media processing device 110. In a particular embodiment task scheduler module 214 may be invoked by dropping a task file into a predefined watch folder which is associated with a predefined job profile. Task scheduler module 214 uses the task file to generate a composite POI video by processing the retrieved recorded video and taking only the sections of the recorded video designated as points of interest within the POI data file received from POI marking device 106. Upon finishing the task, task scheduler module 214 will upload the composite POI video to video portal/streaming server 112 and send a notification back to the requester, i.e., the user of POI marking device 106, which includes a link to the generated composite POI video. In a particular embodiment, the link is a URL associated with the composite POI video.

Referring now to FIGS. 3A-3B, FIGS. 3A-3B are a simplified flow diagram of a procedure for marking point of interest (POI) video clips in real-time and generating composite point of interest (POI) video in accordance with one embodiment of the present disclosure. In 302, a meeting organizer (using meeting organizer device 102) initiates a meeting invite, and sends the meeting invite to calendar server 104. In at least one embodiment, the meeting invite provides a meeting number for participants to connect to the meeting. In a particular embodiment, the meeting invite may include a telephone number to which participants may dial into the meeting. In 304, calendar server 104 sends the meeting invite to all the participants of the meeting along with the meeting number. In the particular embodiment illustrated in FIGS. 3A-3B, calendar server 104 sends the meeting invite to POI marking device 106. In still other embodiments, calendar server 104 may send the meeting invite to another device associated with the user. In 306, the user of POI marking device 106 invokes POI marking module 206. In a particular embodiment, a meeting participant clicks a link included in the meeting invite using POI marking device 106 to invoke POI marking module 206. In 308, the user of the of POI marking device 106 connects to the meeting. In at least one embodiment, the user connects to the meeting using another device such as a personal computer. In still other embodiments, the user may connect to the meeting using POI marking device 106 itself. In still other embodiments, the user may be present at a location in which the video of the meeting may be viewed, such as in a conference room, and then invoke POI marking module 206.

In 310, POI marking device 106 sends a recording start request to recording device 108. In a particular embodiment, the user of POI marking device 106 may click a record button within a graphical user interface provided by POI marking module 206 to initiate recording of the meeting. In a particular embodiment, for subsequent participants who are in the same meeting the record button may by greyed-out to prevent invoking of such if the meeting is already being recorded by another user. In 312, recording device 108 starts recording of the meeting in response to receiving the recording start request from POI marking device 106. In still other embodiments, recording device 108 may be configured to record all meetings without requiring a specific recording request to be initiated by a user. It should be understood that recording device 108 has access to the video and/or audio of the meeting while the meeting is in progress to enable recording of the meeting by recording device 108. In one embodiment, recording device 108 may be the device within communication system 100 responsible for facilitating the meeting. In still another embodiment, recording device 108 may access another device responsible for facilitating the meeting via network(s) 114.

In 314, the user of POI marking device 106 marks the start times and times of one or more points of interest (POIs) in real-time during the presentation or broadcast of the meeting. POI marking device 106 determines a start time and end time of each of the points of interest (POIs) relative to a start time of the video presentation.

In 316, POI marking device 106 sends a recording stop request to recording device 108. In a particular embodiment, the user of POI marking device 106 clicks a stop button within the graphical user interface provided by POI marking module 206 to initiate the sending of the recording stopped request. In 318, recording device 108 stops the recording of the meeting in response to receiving the recording stop request. In still other embodiments, recording device 108 stops the recording of the meeting automatically, such as at the end of the meeting.

In 320, POI marking device 106 submits a POI data file including the user ID, meeting ID, sequence number, and the start and end times of the one or more points of interest (POIs) designated by the user of POI marking device 106 in real-time during the meeting to media processing device 110. In 322, media processing device 110 determines the source video associated with the meeting ID and an sends a request for the video on demand (VOD) or other video file associated with the meeting ID to recording device 108. In 324, recording device 108 sends the VOD file to media processing device 110 in response to receiving the request. In 326, media processing device 110 generates a task file from the POI data file and a VOD file name. In 328, the task file is executed by media processing device 110. In 330, media processing device 110 generates the composite POI video file which includes the video clips designated as points of interest within the POI data file from the task file. In some embodiments, media processing device 110 may further perform post-processing special effects such as adding fade-in/fade-out effects, adding bumper/trailer video, and adding graphics overlays, etc., to the composite POI video.

In 332, media processing device 110 uploads the composite POI video to video portal/streaming server 112. In a particular embodiment, the particular video portal/streaming server 112 to be used for uploading of video is predefined. In 334, media processing device 110 sends a notification with a link to the composite POI video to the user of POI marking device 106 who originally submitted the POI data file. In a particular embodiment, the link includes one or more URLs pointing to the composite POI video on video portal/streaming server 112. In a particular embodiment, the notification is sent to an electronic mail (e-mail) address associated with the user of POI marking device 106. In still another embodiment, the notification is sent directly to POI marking device 106. In 336, the user of POI marking device 106 initiates viewing of the composite POI video. In a particular embodiment, the user of POI marking device 106 clicks the link within the notification to view the generated composite POI video. In still other embodiments, the user may optionally forward the notification to other people so that they may view the composite POI video as well. In 338, the user of POI marking device 106 sends a composite POI video request to video portal/streaming server 112. In a particular embodiment, the composite POI video request may be sent by POI marking device 106. In 340, the user of POI marking device 106 receives the composite POI video from video portal/streaming server 112. In one embodiment, the composite POI video may be streamed to the user of POI marking device 106. In still other embodiments, the composite POI video may be downloaded in part or in entirety before viewing of the composite POI video by the user of POI marking device 106. In one embodiment, the composite POI video is provided to POI marking device 106. In still other embodiments, the user may request and view the composite POI video from another device, such as a personal computer, instead of POI marking device 106.

Figure 4:
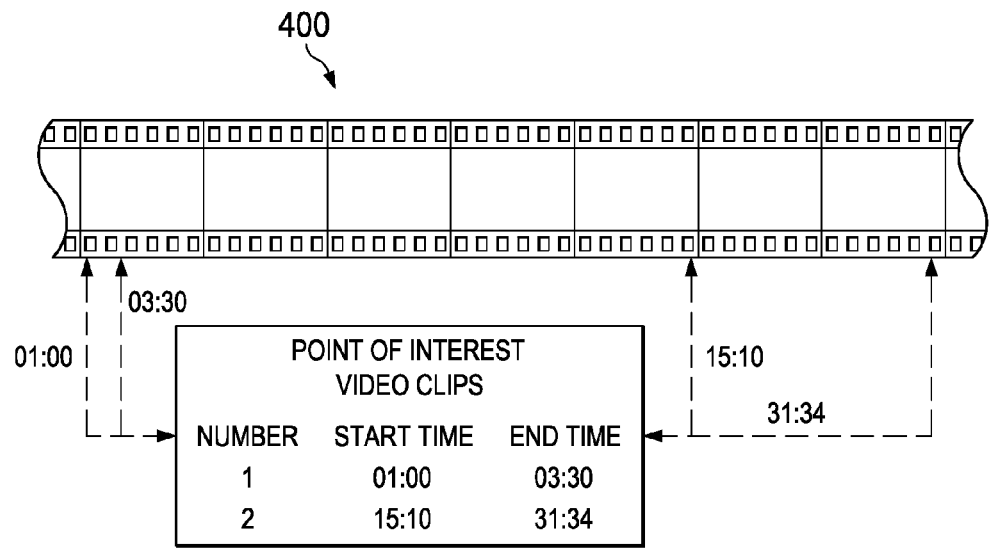
FIG. 4 is a simplified diagram illustrating an example of point of interest (POI) video clips in accordance with an embodiment of the present disclosure.

Referring now to FIG. 4, FIG. 4 is a simplified diagram illustrating an example of point of interest (POI) video clips in accordance with an embodiment of the present disclosure. The diagram of FIG. 4 illustrates a relationship between data in a POI data file and an original video of an event. As shown in FIG. 4, a first POI video clip (No. 1) is designated with a start time at the 1:00 minute mark and an end time at the 3:30 minute mark. A second POI video clip (No. 2) is designated with a start time at the 15:10 minute mark and an end time at the 31:34 minute mark. In a particular embodiment, a composite POI video generated from this POI data will include the portions of the original video between the 1:00 minute mark and the 3:30 minute mark, and the 15:10 minute mark and the 31:34 minute mark while omitting the rest of the original video. In still other embodiments, composite POI video may include other portions of the original POI video in addition to the portions of the video marked as points of interest (POIs).

Figures 5A, 5B:
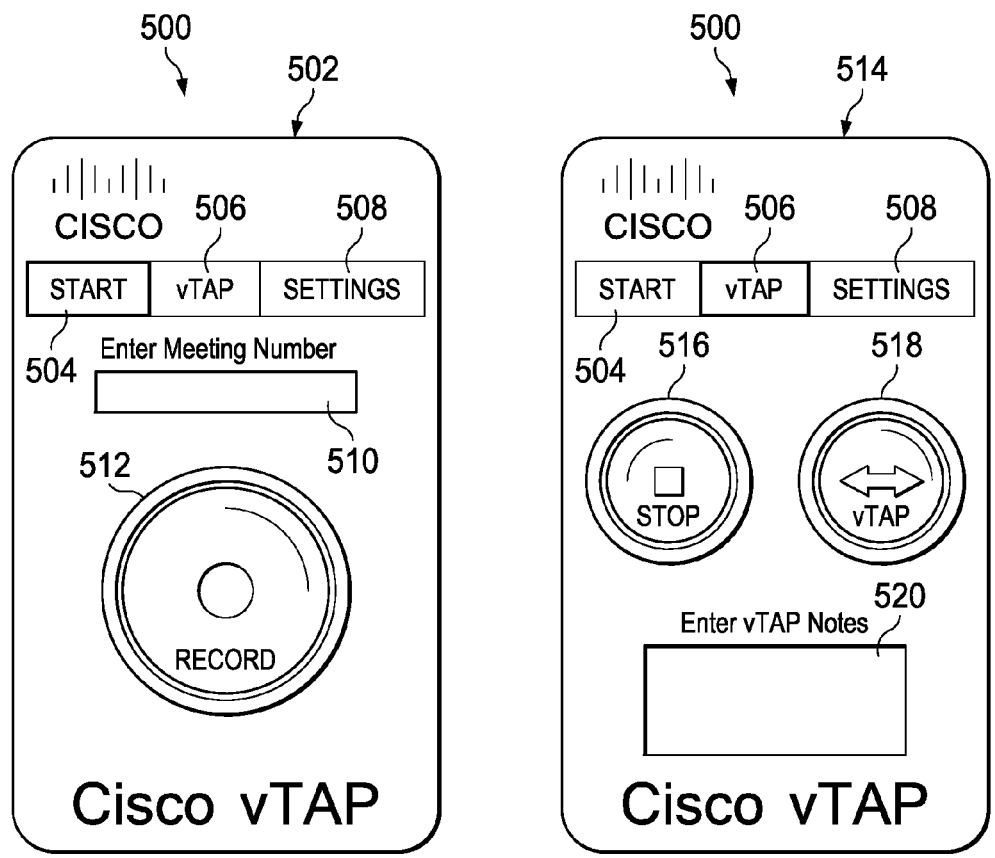
FIGS. 5A-5H are a simplified illustration of a graphical user interface (GUI) of the point of interest (POI) marking device in accordance with an embodiment of the present disclosure.

Referring now to FIGS. 5A-5H, FIGS. 5A-5H are a simplified illustration of a graphical user interface (GUI) 500 of point of interest (POI) marking device in accordance with an embodiment of the present disclosure. FIG. 5A illustrates an initial screen 502 of the GUI 500 of the POI marking device 106. Initial screen 502 includes a start button 504, a "Vtap" button 506, a settings button 508, a meeting number field 510, and a record button 512. Start button 504 may be used to start and stop POI marking module 206, "Vtap" button 506 may be used to enter the recording and POI marking interface screens of POI marking device 106, settings button 508 may be used to change various settings associated with the POI marking module 206 such as user preferences, meeting number field 510 may be used to enter a meeting number associated with a particular meeting, and record button 512 may be used to initiate recording of the meeting. In still other embodiments, the meeting ID may be automatically entered at the time of, or close to the time of, the scheduled meeting. FIG. 5B illustrates a screen 514 of GUI 500 in which "Vtap" button 506 has been pressed and a recording of a meeting has begun. A stop button 516 is provided to stop recording of the meeting, and "Vtap" button 518 is provided to designate start and end times of POIs. A note field 520 is provided in which a user may enter notes associated with a particular designated POI. The notes may include feedback concerning the particular section of the video marked by the POI or any other notes desired by the user. The composite POI video generated from the POI data may include the notes as searchable metadata so that a later viewer can search the composite POI video for keywords or other information contained in the metadata. The user may then view the portion of the composite POI video containing the searched metadata.

Figure 5C:
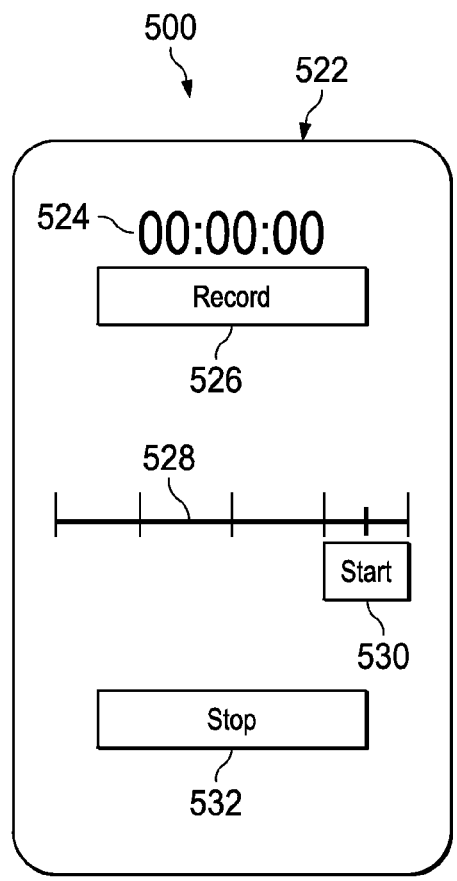

FIG. 5C illustrates another embodiment of GUI 500 of POI marking device 106 including a screen 522 providing a user interface to allow starting and stopping of recording of a meeting as well as the designating of one or more POI's during a meeting. Screen 522 includes a time clock 524, which records the time that has elapsed since the record button 526 has been pressed. Record button 526 records a meeting identified by a meeting ID, which is passed to POI marking module 206 through a calendar entry, received from calendar server 104. Screen 522 further includes a slider bar 528, which may be used in conjunction with a start button 530 to adjust the start time of a particular POI. A user may use slider bar 528 to go back a certain amount of time as a new start time for a particular POI. This allows a user to designate a start time for the POI, which is other than that of the current time to allow designation of a portion of the meeting, which the user only later identifies as a point of interest and wishes to preserve that portion of the meeting. In a particular embodiment, slider bar 528 defaults to the current time as the start time of the POI, but the user can slide slider bar 528 left to mark a start time for the POI earlier than the current time, such as 5, 10 or 30 seconds prior to the current start time, to record a POI from a time that has already passed. Start button 530 is used to designate a start time of it POI clip initially it is disabled. However once the recording starts, start button 530 is enabled once pressed and is then disabled until stop button 532 is pressed. Stop button 532 marks the end of the POI clip. In a particular embodiment, stop button 532 is initially disabled but is enabled once start button 530 is pressed. In the particular embodiment illustrated in FIG. 5C, record button 526 is enabled but has not yet been pressed, and start button 530 and stop button 532 are disabled. In still other embodiments, start button 530 and stop button 532 may be combined into a single button within GUI 500.

Figure 5D:
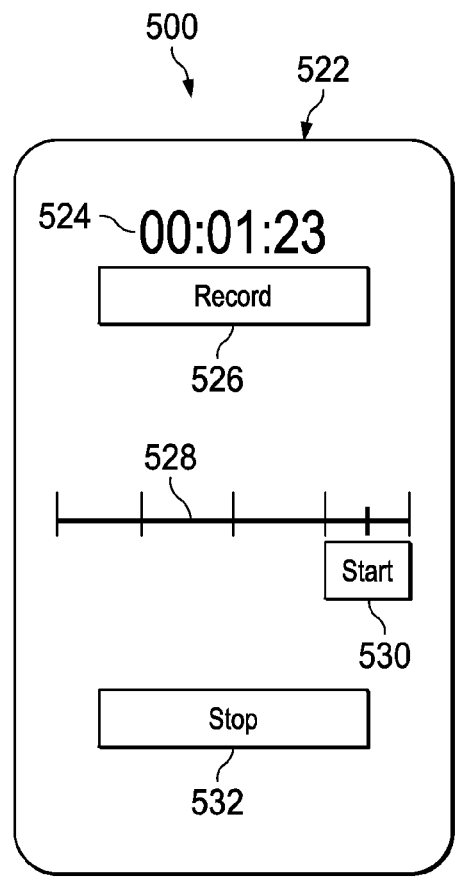
Figure 5E:
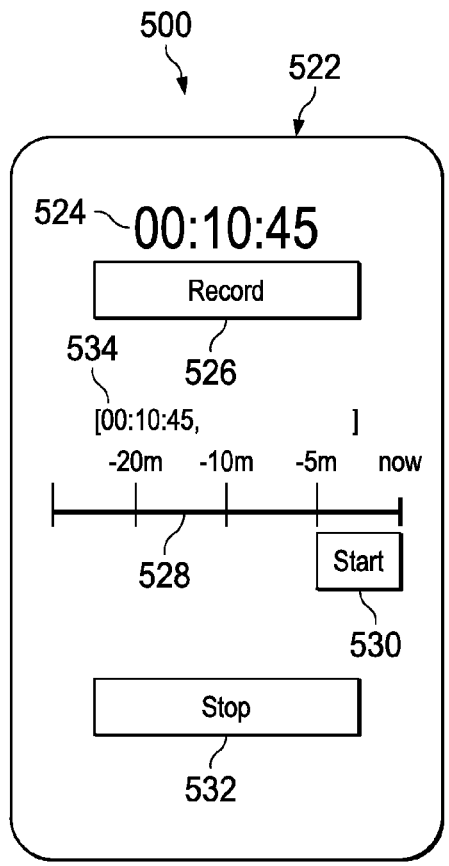
Figure 5F:
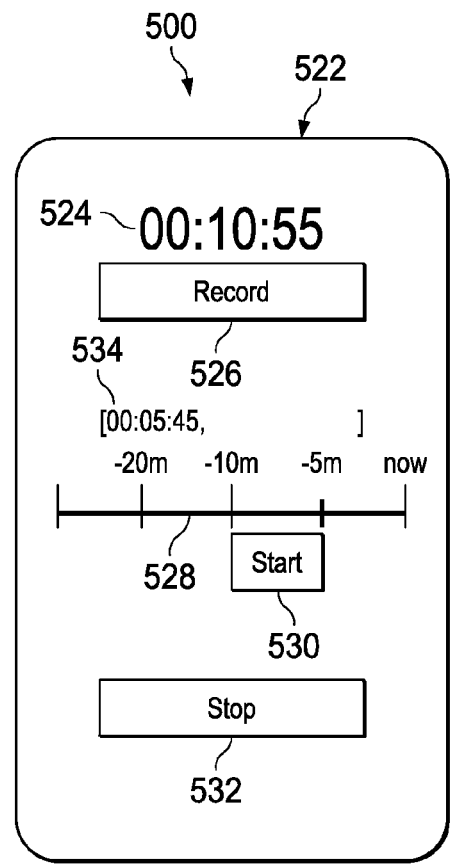
Figure 5G:
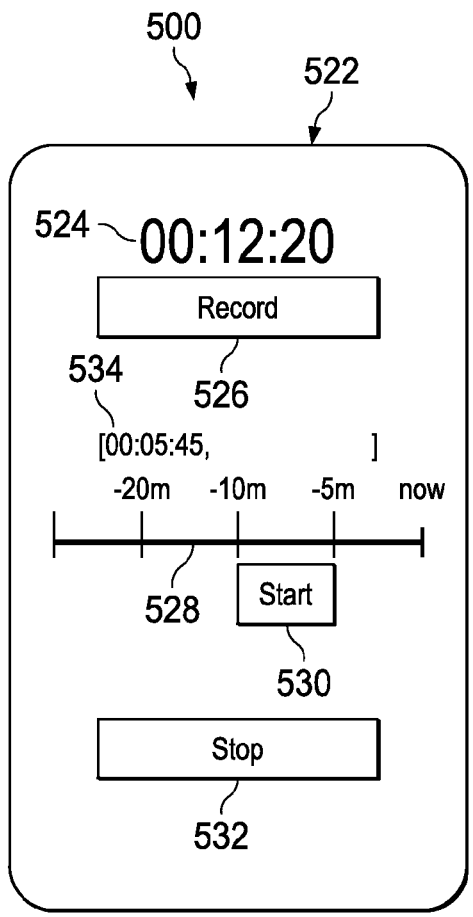
Figure 5H:
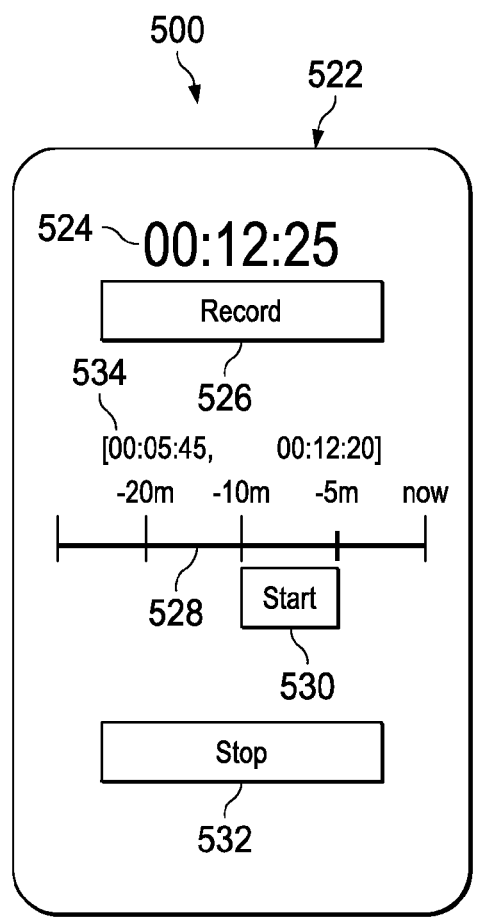

FIG. 5D illustrates GUI 500 in which the user has pressed record button 526 and which was disabled immediately thereafter. Start button 530 is then enabled. FIG. 5E-5F illustrates that at time 00:10:45 the meeting recording started, the user pressed start button 530 (FIG. 5E), and then the user slid start button 530 to the left to the five minute prior mark (FIG. 5F) to mark a new start point (00:5:45) of the POI. Once released, start button 530 is disabled and stop button 532 is enabled. FIG. 5G-5H illustrate that at time 12:20, the user pressed stop button 532, which marked the endpoint for this particular POI clip. Start button 530 was then enabled, and stop button 532 became disabled. By repeating the above sequence described with respect to FIGS. 5C-5H, the user can mark additional POI clips during the video presentation using GUI 500 of POI marking device 106. At the end of the recording the user can press another button to stop recording such as stop button 516 illustrated in FIG. 5B.

Figure 6:
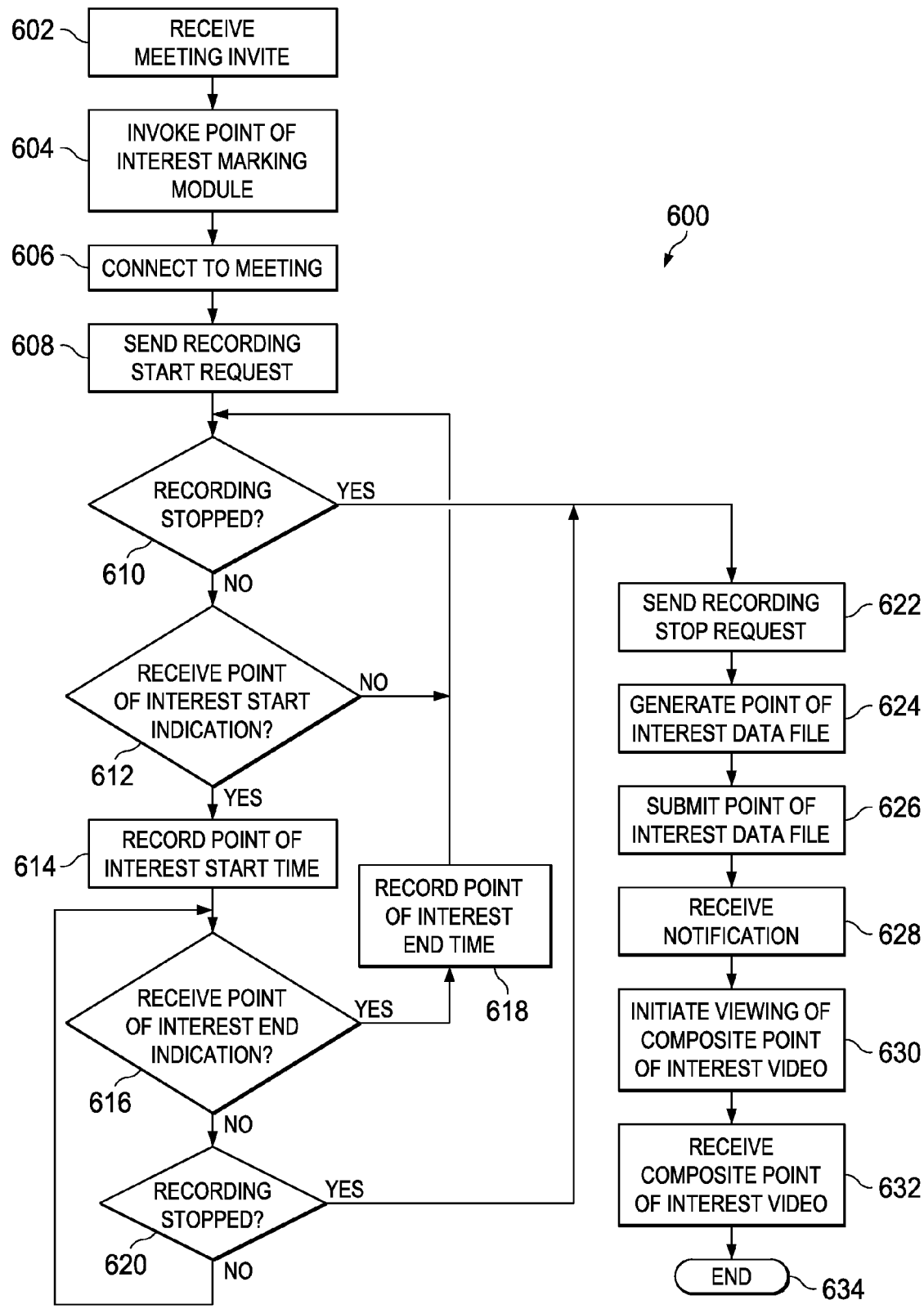
FIG. 6 is a simplified flowchart illustrating a procedure for marking point of interest (POI) video clips by the POI marking device in accordance with an embodiment of the present disclosure.

FIG. 6 is a simplified flowchart illustrating a procedure 600 for marking point of interest (POI) video clips by POI marking device 106 in accordance with an embodiment of the present disclosure. In 602, POI marking device 106 receives a meeting invite from calendar server 104, which invites one more participants to participate in a meeting or event having video and/or audio components. In at least one embodiment, the meeting invite includes a meeting number associated with the meeting. The meeting number allows a participant to connect to the meeting. In 604, POI marking module 206 is invoked. In a particular embodiment, POI marking module 206 is invoked by a user of POI marking device 106 by clicking a link included in the meeting invite. In still other embodiments, POI marking module 206 may be invoked automatically at the time of the scheduled meeting. In 606, the user of POI marking device 106 connects to the meeting designated in the meeting invite. In at least one embodiment, the user connects to the meeting using another device such as a personal computer. In other embodiments, the user may connect to the meeting using POI marking device 106 itself. In still other embodiments, the user may be present at a location in which the video of the meeting may be viewed, such as in a conference room. In 608, POI marking device 106 sends a recording start request to recording device 108. Recording device 108 initiate recording of the meeting in response to receiving the recording start request from POI marking device 106.

In 610, POI marking device 106 determines whether the recording has been stopped. If the recording has not been stopped, procedure 600 continues to 612. In 612, POI marking device 106 determines whether it has received a POI start indication from the user. If a POI start indication has not been received, procedure 600 returns back to 610. However, if a POI start indication has been received, procedure 600 continues to 614. In 614, the POI start time is recorded. In 616, POI marking device 106 determines whether a POI end indication has been received. If no POI end indication has been received, procedure 600 continues to 620 in which it is determined whether the recording has been stopped. If the recording has not been stopped, procedure 600 returns to 616. If it is determined in 616 that a POI end indication has been received, POI marking device 106 records the POI end time in 618 and procedure 600 returns to 610. If it is determined in either 610 or 620 that the recording has stopped, procedure 600 continues to 622. The recording may be determined as stopped either as a result of user of the POI marking device 106 pressing a stop button, or in the event or meeting ending. In 622, POI marking device 106 sends a recording stop request to recording device 108 if the recording has not already been stopped by recording device 108. In response to receiving the recording stop request, recording device 108 stops the recording of the event or meeting.

In 624, POI marking device 106 generates a POI data file from the start and end times of the particular POIs designated by the user of POI marking device 106 as previously described herein. As previously discussed, the POI data file may also include a user ID of the requester, a meeting ID, a sequence number to identify a POI video clip sequence, and other POI data associated with the meeting or presentation. In 626, POI marking device 106 submits the POI data file to media processing device 110. After media processing device 110 processes the POI data file and the video file associated with the meeting to generate a composite POI file, media processing device 110 sends a notification to the user of POI marking device 106. In a particular embodiment, media processing device 110 sends the notification to POI marking device 106. In still other embodiments, the notification is received by another device associated with the user.

In 628, POI marking device 106, or other device associated with the user, receives the notification from media processing device 110 including one or more links to video portal/streaming server 112 from which the composite POI video may be obtained. In 630, the user of POI marking device 106 initiates viewing of the composite POI video from video portal/streaming server 112. In at least one embodiment, POI marking device 106 initiates viewing of the composite POI video. In a particular embodiment, the initiation of the viewing of the composite POI video may be performed by the user of POI marking device 106 clicking a link in the notification message. In one embodiment, POI marking device 106 may be further configured to allow the user to forward the notification to other people so that they may view the composite POI video as well. In 632, POI marking device 106 receives the composite POI video from the video portal/streaming server 112. In still other embodiments, another device associated with the user receives the composite POI video from video portal/streaming server 112. In 634, procedure 600 ends.

Figure 7:
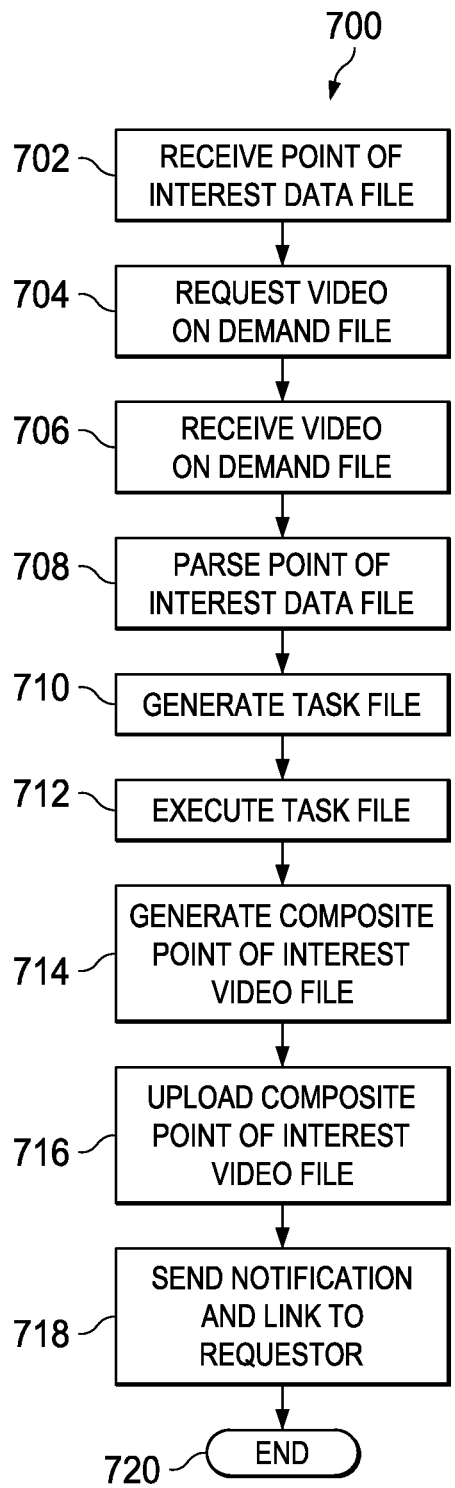
FIG. 7 is a simplified flowchart illustrating a procedure for generating composite point of interest (POI) video by the media processing device (MPD) in accordance with an embodiment of the present disclosure.

FIG. 7 is a simplified flowchart illustrating a procedure 700 for generating composite point of interest (POI) video by media processing device (MPD) 110 in accordance with an embodiment of the present disclosure. In 702, POI file processing module 212 of media processing device 110 receives a POI data file from POI marking device 106. In 704, media processing device 110 requests a VOD file or other video file associated with the meeting from recording device 108. In at least one embodiment, media processing device 110 looks up the meeting ID to find the location of the recorded VOD file so that the recorded VOD file may be fetched from the correct recording device 108. In a particular embodiment, the request includes the meeting ID, which is used by recording device 108 to identify a particular VOD file associated with the meeting. In 706, media processing device 110 receives the VOD file from recording device 108. In 708, media processing device 110 parses the POI data file to extract the POI data associated with each POI designated by the user of POI marking device 106. In 710, media processing device 110 generates a task file based on the parsed POI data. The task file may include metadata such as a date, time, meeting title, participant names, author, etc. of the meeting as well as a source of video, source of audio, and start times and end times of each of the marked POIs.

In 712, media processing device 110 executes the task file using task scheduler module 214. In a particular embodiment, task scheduler module 214 may be invoked by dropping the task file in a predetermined watch folder associated with a predefined job profile. In still other embodiments, task scheduler module 214 may be invoked by other procedures instead of through the user of a watch folder. In 714, task scheduler module 214 of media processing device 110 generates a composite POI video file from the received VOD file and the POI data file as previously discussed herein. In some embodiments, MPD 110 may additionally perform post-processing special effects such as adding fade-in/fade-out effects, adding bumper/trailer video, and adding graphics overlays, etc. to the composite POI video file. In 716, media processing device 110 uploads the composite POI video file to video portal/streaming server 112. In a particular embodiment, the particular video portal/streaming server 112 to which media processing device 110 uploads the composite POI video file may be predefined. In 718, media processing device 110 sends a notification and link associated with the composite POI video to the requester. In a particular embodiment, the requester is the user of POI marking device 106. In 720, procedure 700 ends.

One or more embodiments described in the present disclosure provide a simple way for marking POI clips in real-time during an event, and utilizing network-based services to process the request and generate composite POI video. Various embodiments may also provide streamlining of the overall video capturing, processing, and sharing process and enable additional value-added services as described herein.

In some embodiments, "wisdom of the crowd" functionality is enabled by comparing and sharing POIs from multiple participants. For example, in a particular embodiment, media processing device 110 may receive POI data files from multiple participants or viewers of an event in which each of the participants has marked one or more POIs during the event using their respective handheld devices each including POI marking module 106. Media processing device 110 then generates a composite POI video file based on the POI data from one or more of the participants. For example, media processing device 110 may indicate that a particular section of the video has been marked as a POI by multiple participants indicating that the particular section of the video is of interest to multiple people. In still other embodiments, the composite POI video file may include only the sections of the original video that have been marked as POIs by a predetermined number or percentage of participants and/or viewers so that only the most relevant portions are included. Such an embodiment allows the content of a video to be easily consumed by a later viewer of the composite POI video as the viewer only has to view the most relevant sections of the original video.

Note that in certain example implementations, the marking of point of interest video clips in real-time and generating of composite point of interest video functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element [as shown in FIGS. 2A-2B] can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor [as shown in FIG. 2A-2B] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

In one example implementation, POI marking device 106 and/or media processing device 110 may include software in order to achieve the marking of point of interest video clips in real-time and generating of composite point of interest video functions outlined herein. These activities can be facilitated by POI marking module 206, POI file processing module 212, and task scheduler module 214 (where these modules can be suitably combined in any appropriate manner, which may be based on particular configuration and/or provisioning needs). POI marking device 106 and media processing device 110, as well as one or more of meeting organizer device 102, calendar server 104, recording device 108, and video portal/server 112, can include memory elements for storing information to be used in achieving the marking of point of interest video clips in real-time and generating of composite point of interest video activities, as discussed herein. Additionally, POI marking device 106 and/or media processing device 110, as well as one or more of meeting organizer device 102, calendar server 104, recording device 108, and video portal/server 112, may include a processor that can execute software or an algorithm to perform the marking of point of interest video clips in real-time and generating of composite point of interest video operations, as disclosed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein (e.g., database, tables, trees, cache, etc.) should be construed as being encompassed within the broad term 'memory element.' Similarly, any of the potential processing elements, modules, and machines described in this Specification should be construed as being encompassed within the broad term 'processor.' Each of the entities, devices, or servers described herein can also include suitable interfaces for receiving, transmitting, and/or otherwise communicating data or information in a network environment.

It should be appreciated that communication system 100 (and its teachings) are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

It is also important to note that the steps in the preceding flow diagrams illustrate only some of the possible signaling scenarios and patterns that may be executed by, or within, communication system 100. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure. Although the present disclosure has been described in detail with reference to particular arrangements and configurations, these example configurations and arrangements may be changed significantly without departing from the scope of the present disclosure. Additionally, although communication system 100 has been illustrated with reference to particular elements and operations that facilitate the communication process, these elements and operations may be replaced by any suitable architecture or process that achieves the intended functionality of communication system 100.

What is claimed is:

1. A method, comprising:
   receiving an indication of a start of a point of interest associated with a portion of a video presentation from a participant of the video presentation;
   determining a start time of the point of interest relative to a start time of the video presentation;
   determining an end time of the point of interest relative to the start time of the video presentation;
   generating a point of interest data file that includes the start time and end time of the point of interest;
   receiving textual data associated with the point of interest, wherein the textual data is entered by the participant of the video presentation during presenting of the video presentation to the participant;
   inserting the textual data as metadata within the point of interest data file;
   inserting a user ID identifying the participant of the video presentation into the point of interest data file; and
   sending the point of interest data file to a processing device configured to generate a composite point of interest video including the portion of the video presentation associated with the point of interest, wherein the composite point of interest video further includes the textual data in a form that is text searchable by a viewer of the composite point of interest video.

2. The method of claim 1, wherein the receiving of the indication of the start of the point of interest is performed in real-time in conjunction with presenting the video presentation.

3. The method of claim 1, wherein the receiving of the indication of the end time of the point of interest is performed in real-time in conjunction with presenting the video presentation.

4. The method of claim 1, further comprising:
   sending a recording start request to a recording device, wherein the recording device initiates recording of the video presentation responsive to receiving the start request.

5. The method of claim 1, further comprising:
   receiving a notification including a link associated with the composite point of interest video.

6. The method of claim 5, further comprising:
   receiving the composite point of interest video associated with the composite point of interest video.

7. A non-transitory tangible computer readable media that includes code for execution and when executed by a processor operable to perform operations comprising:
   receiving an indication of a start of a point of interest associated with a portion of a video presentation from a participant of the video presentation;
   determining a start time of the point of interest relative to a start time of the video presentation;
   determining an end time of the point of interest relative to the start time of the video presentation;
   generating a point of interest data file that includes the start time and end time of the point of interest;
   receiving textual data associated with the point of interest, wherein the textual data is entered by the participant of the video presentation during presenting of the video presentation to the participant;
   inserting the textual data as metadata within the point of interest data file;
   inserting a user ID identifying the participant of the video presentation into the point of interest data file; and
   sending the point of interest data file to a processing device configured to generate a composite point of interest video including the portion of the video presentation associated with the point of interest, wherein the composite point of interest video further includes the textual data in a form that is text searchable by a viewer of the composite point of interest video.

8. The computer readable media of claim 7, wherein the receiving of the indication of the start of the point of interest is performed in real-time in conjunction with presenting the video presentation.

9. The computer readable media of claim 7, wherein the receiving of the indication of the end time of the point of interest is performed in real-time in conjunction with presenting the video presentation.

10. The computer readable media of claim 7, wherein the operations further comprise:
    sending a recording start request to a recording device, wherein the recording device initiates recording of the video presentation responsive to receiving the start request.

11. The computer readable media of claim 7, wherein the operations further comprise:
    receiving a notification including a link associated with the composite point of interest video.

12. The computer readable media of claim 11, wherein the operations further comprise:
    receiving the composite point of interest video associated with the composite point of interest video.

13. An apparatus, comprising:
    a memory element configured to store data;
    a processor operable to execute instructions associated with the data; and
    a point of interest marking module coupled to the processor, the apparatus being configured to:

receive an indication of a start of a point of interest associated with a portion of a video presentation from a participant of the video presentation;

determine a start time of a point of interest relative to a start time of the video presentation;

determine an end time of the point of interest relative to the start time of the video presentation;

generate a point of interest data file that includes the start time and end time of the point of interest;

receive textual data associated with the point of interest, wherein the textual data is entered by the participant of the video presentation during presenting of the video presentation to the participant;

insert the textual data as metadata within the point of interest data file;

inserting a user ID identifying the participant of the video presentation into the point of interest data file; and send the point of interest data file to a processing device configured to generate a composite point of interest video including the portion of the video presentation associated with the point of interest, wherein the composite point of interest video further includes the textual data in a form that is text searchable by a viewer of the composite point of interest video.

14. The apparatus of claim 13, wherein the receiving of the indication of the start of the point of interest is performed in real-time in conjunction with presenting the video presentation.

15. The apparatus of claim 13, wherein the receiving of the indication of the end time of the point of interest is performed in real-time in conjunction with presenting the video presentation.

16. The apparatus of claim 13, wherein the apparatus is further configured to send a recording start request to a recording device, wherein the recording device initiates recording of the video presentation responsive to receiving the start request.

17. The apparatus of claim 13, wherein the apparatus is further configured to receive a notification including a link associated with the composite point of interest video.

18. The apparatus of claim 17, wherein the apparatus is further configured to receive the composite point of interest video associated with the composite point of interest video.

19. A method, comprising:

receiving point of interest data file that includes a start time and an end time of a point of interest associated with a portion of a video presentation, wherein the start time and the end time of the point of interest are determined in real-time by a participant of the video presentation in conjunction with presenting the video presentation, wherein the point of interest data file includes textual data associated with the point of interest, wherein the textual data is entered by the participant of the video presentation during presenting of the video presentation to the participant and inserted as metadata within the point of interest data file, wherein the point of interest data file further includes a user ID identifying the participant of the video demonstration;

receiving a video file associated with the video presentation; and generating a composite point of interest video file from the video file based on the start time and the end time of the point of interest, wherein the composite point of interest video further includes the textual data in a form that is text searchable by a viewer of the composite point of interest video.

20. The method of claim 19, further comprising:

sending the composite point of interest video file to a server.

21. The method of claim 20, further comprising:

sending a notification including a link associated with a location of the composite point of interest video file on the server.

22. The method of claim 19, further comprising:

parsing the point of interest data to obtain the start time and the end time of the point of interest.

* * * * *